United States Patent
Jang et al.

(10) Patent No.: US 9,502,983 B2
(45) Date of Patent: Nov. 22, 2016

(54) POWER SUPPLY DEVICE CAPABLE OF VARYING SWITCHING FREQUENCY ACCORDING TO LOAD CONDITION

(71) Applicant: FAIRCHILD KOREA SEMICONDUCTOR LTD., Bucheon-si (KR)

(72) Inventors: Kyung-Oun Jang, Bucheon-Si (KR); In-Ki Park, Seoul (KR); Hyun-Chul Eum, Seoul (KR); Sung-Won Yun, Seoul (KR)

(73) Assignee: Fairchild Korea Semiconductor LTD. (KR)

( * ) Notice: Subject to any disclaimer, the term of this patent is extended or adjusted under 35 U.S.C. 154(b) by 0 days.

(21) Appl. No.: 14/668,852

(22) Filed: Mar. 25, 2015

(65) Prior Publication Data

US 2015/0280581 A1    Oct. 1, 2015

Related U.S. Application Data

(60) Provisional application No. 61/971,466, filed on Mar. 27, 2014.

(30) Foreign Application Priority Data

Mar. 24, 2015 (KR) .................. 10-2015-0040753

(51) Int. Cl.
*H02M 3/335* (2006.01)
*H02M 1/00* (2006.01)

(52) U.S. Cl.
CPC . *H02M 3/33507* (2013.01); *H02M 2001/0032* (2013.01); *Y02B 70/16* (2013.01)

(58) Field of Classification Search
CPC ................................................. H02M 3/33507
See application file for complete search history.

(56) References Cited

U.S. PATENT DOCUMENTS

| | | | |
|---|---|---|---|
| 6,212,079 B1 | 4/2001 | Balakrishnan et al. | |
| 2013/0128627 A1* | 5/2013 | Moon | H02M 3/33507 363/21.17 |
| 2014/0104894 A1* | 4/2014 | Yamane | H02M 3/33523 363/21.13 |
| 2014/0160809 A1* | 6/2014 | Lin | H02M 3/33523 363/21.16 |

* cited by examiner

*Primary Examiner* — Emily P Pham
(74) *Attorney, Agent, or Firm* — Grossman Tucker Perreault & Pfleger PLLC

(57) ABSTRACT

A power supply device includes a power switch, a power delivering means configured to convert an input in accordance with switching operation of the power switch and output a result, and a switch control circuit configured to linearly control switching frequency of the power switch in accordance with an output detection voltage corresponding to an output voltage according to the output.

11 Claims, 4 Drawing Sheets

POWER SUPPLY DEVICE CAPABLE OF VARYING SWITCHING FREQUENCY ACCORDING TO LOAD CONDITION

CROSS-REFERENCE TO RELATED APPLICATION

This application claims priority from U.S. Patent Provisional Application No. 61/971,466, filed in the United States Patent & Trademark Offices (USPTO) on Mar. 27, 2014, and Korean Patent Application No. 10-2015-0040753, filed with the Korean Intellectual Property Office on Mar. 24, 2015, the entire contents of which are incorporated herein by reference.

BACKGROUND

1. Field

Embodiments of the present invention relate to a power supply device which controls switching frequency.

2. Discussion of Related Art

It is necessary to vary switching frequency depending on load condition to improve efficiency. Feedback data is acquired according to loads and switching frequency is determined based on the feedback data. The efficiency depends on the load condition, and it is thus necessary to provide a switching frequency control which can provide improved efficiency irrespective of loading condition.

SUMMARY

A power supply device is provided, which is capable of varying switching frequency according to load condition.

In one embodiment, a power supply device includes a power switch, a power delivering circuit configured to convert an input in accordance with switching operation of the power switch and output a result, and a switch control circuit configured to linearly control switching frequency of the power switch in accordance with an output detection voltage corresponding to an output voltage according to the output.

The switch control circuit linearly controls the switching frequency of the power switch in accordance with a sample voltage obtained by sampling the output detection voltage at a predetermined time point during a turn-off period of the power switch.

The switch control circuit generates a reference current linearly varying in accordance with the sample voltage, and controls the switching frequency of the power switch in accordance with the reference current.

The switch control circuit generates a source current and a sink current based on the reference current, generates a clock signal and a sawtooth wave signal using the source current and the sink current, and controls the switching operation of the power switch using the clock signal and the sawtooth wave signal.

The switch control circuit controls turn-on of the power switch based on the clock signal, and controls turn-off of the power switch based on the sawtooth wave.

The switch control circuit includes a sample/holder configured to sample the output detection voltage at a predetermined time point during a turn-off period of the power switch and generate a sample voltage by holding the sampled voltage, a linear controller configured to generate a reference current which varies linearly according to the sample voltage, an oscillator configured to generate a clock signal and a sawtooth wave signal, which linearly vary frequency according to the reference current, and a PWM controller configured to control the switching operation of the power switch, using the clock signal and the sawtooth wave signal.

The linear controller includes a buffer configured to receive an input of the sample voltage and output a result, a resistor with one end connected to an output end of the buffer, a transistor with one electrode connected to the other end of the resistor, an error amplifier comprising an output end connected to a gate of the transistor, a first input end to which a predetermined reference voltage is inputted, and a second input end connected to the other end of the resistor, and a current mirror circuit connected to the other electrode of the transistor.

The oscillator generates a source current and a sink current in accordance with the reference current, and generates the clock signal and the sawtooth wave signal using the source current and the sink current.

The oscillator includes a first current mirror circuit configured to generate a first current by copying the reference current at a predetermined ratio, a second current mirror circuit configured to generate a second current by copying a current from subtracting the first current from a current of a predetermined current source, at a predetermined ratio, a third current mirror circuit configured to generate the source current by copying the second current at a predetermined ratio, a fourth current mirror circuit configured to generate the sink current by copying the third current corresponding to the second current at a predetermined ratio, and a clock/sawtooth wave generator configured to generate the sawtooth wave which increases in accordance with the source current and decreases in accordance with the sink current, and generate the clock signal based on a result of comparing the sawtooth wave with a predetermined reference voltage.

The power supply device additionally includes an auxiliary winding insulatively coupled, at a predetermined turns ratio, with a winding connected to the output voltage, and the output detection voltage is based on voltages at both ends of the auxiliary winding.

The switch control circuit linearly controls switching frequency of the power switch in accordance with the output detection voltage when a cycle skipping does not occur or the switching frequency is not maintained in constant.

Accordingly, a power supply device which can vary the switching frequency depending on load condition is provided.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
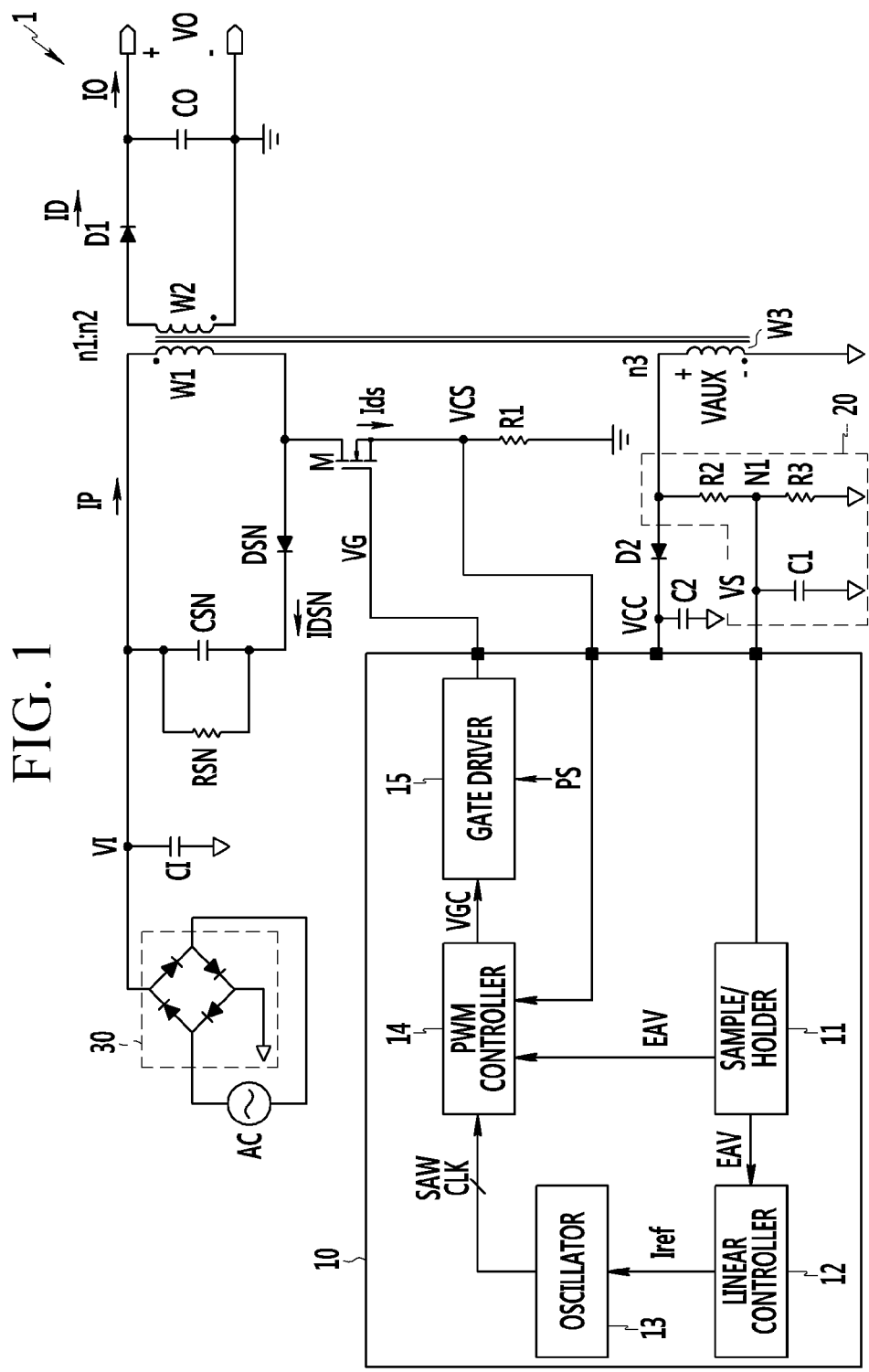
FIG. 1 illustrates a power supply device according to an embodiment.

The present invention will be described more fully hereinafter with reference to the accompanying drawings, in which exemplary embodiments of the invention are shown. Exemplary embodiments of the present invention are described below in sufficient detail to enable those of ordinary skill in the art to embody and practice the present invention. This invention may, however, be embodied in different forms and should not be construed as limited to the embodiments set forth herein. In the descriptions of the present invention, known configurations that are not related to the gist of the present invention may be omitted so as to explain the present invention clearly. With the addition of reference numerals in components of each drawing, like numerals refer to like components.

Throughout the specification, it will be understood that when an element is referred to as being "connected" or "coupled" to another element, it can be directly connected or coupled to the other element or may be "electrically connected or coupled" via intervening elements which may be present. Further, it will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

FIG. 1 illustrates a power supply device according to an embodiment.

The power supply device 1 may include a capacitor CI, a primary side winding W1, a secondary side winding W2, a rectification diode D1, a capacitor CO, a power switch M, a detection resistor R1, a switch control circuit 10, a detection voltage generator 20 and a rectification circuit 30.

As shown in FIG. 1, the power supply device 1 may be implemented in a flyback type, but may be implemented as other type of converter.

Additionally, an embodiment may employ a transformer as a power delivery device which delivers an input as an output, in accordance with switching operation of the power switch M. For example, a transformer including the primary side winding W1 and the secondary side winding W2 insulated from the primary side, may be used as a power delivery circuit. However, the power supply circuit connected to the power switch M is not limited to any of the specific examples mentioned above. Accordingly, depending on a type of converter as applied in the power supply device 1, an inductor may be used instead of the transformer.

Alternating current (AC) input may be rectified through the rectification circuit 30. The rectification circuit 30 may be a full bridge diode which is a full wave rectifier.

One of the electrodes of the capacitor CI may be connected to one end of the rectification circuit 30 and one end of the primary side winding W1, and the other electrode of the capacitor CI may be connected to the primary side ground. Noise of the rectified AC input may be filtered through the capacitor CI. The voltage input to the capacitor CI may be referred to as an input voltage VI.

The power supply device 1 may additionally include a snubber circuit. Although FIG. 1 illustrates a snubber circuit including a snubber diode DSN, a snubber capacitor CSN and a snubber resistor RSN, embodiments are not limited to the specific example.

The snubber diode DSN may include an anode which is connected to a contact between the primary side winding W1 and a drain of the power switch M. The snubber resistor RSN and the snubber capacitor CSN are connected in parallel with each other between the input voltage VI and a cathode of the snubber diode DSN. After turn-off of the power switch M, electric currents IP flowing through the primary side winding W1 may flow through the snubber circuit for a certain period of time. The snubber diode DSN is turned on for a duration between turn-off of the power switch M and a time point the electric current IP drops to zero current. During the turn-on period of the snubber diode DSN, the snubber current IDSN may flow through the snubber resistor RSN and the snubber capacitor CSN.

The input voltage VI is delivered to the primary side winding W1, and the other end of the primary side winding W1 is connected to the drain of the power switch M. A detection resistor R1 is connected between a source and a ground of the power switch M. During turn-on period of the power switch M, current detection voltage VCS is generated by the switch current Ids and the detection resistor R1.

Gate voltage VG is inputted to a gate of the power switch M. The power switch M controls the power delivered from the primary side to the secondary side. The primary side and the secondary side are insulated from each other. The power switch M may be an n-channel transistor, in which case a high level is used to turn on the power switch M, while low level is used to turn off the power switch M.

The secondary side winding W2 may be electrically connected to the output voltage VO. One end of the secondary side winding W2 may be connected to an anode electrode of the rectification diode D1. When the rectification diode D1 is ON, discharge current ID flowing through the rectification diode D1 is delivered to the capacitor CO and loads (not illustrated).

When the power switch M turns on, electric current IP flows the primary side winding W1 and energy is stored at the primary side winding W1. During this period, the rectification diode D1 is in OFF state. When the power switch M turns off and the rectification diode D1 is ON, the energy stored at the primary side winding W1 is delivered to the secondary side winding W2 and discharge current ID flows through the rectification diode D1. The output current IO is determined depending on the discharge current ID and the period during which the discharge current ID flows.

An auxiliary winding W3 is positioned at the primary side of the power supply device 1 shown in FIG. 1, electromagnetically coupled with the primary side winding W1 at a predetermined turns ratio (n1:n3, where n1 is a number of turns of W1, and n3 is a number of turns of W3), and insulatively coupled with the secondary side winding W2 at a predetermined turns ratio (n2:n3, where n2 is a number of turns of W2, and n3 is a number of turns of W3).

During ON period of the power switch M, the voltage at both ends of the primary side winding W1 is the input voltage VI. Since voltages at both ends of the auxiliary winding W3 (hereinafter, "auxiliary voltage VAUX") has opposite polarity to that of the voltage at both ends of the primary side winding W1, during ON period, the voltage at both ends of the auxiliary winding W3 is: n13*Vin(n13=n3/n1).

During OFF period of the power switch M, the voltage at both ends of the primary side winding W1 is negative voltage proportional to the output voltage VO, and the auxiliary voltage VAUX during OFF period is positive voltage proportional to the output voltage VO, which is: n23*VO(n23=n3/n2).

The diode D2 rectifies the current flowing through the auxiliary winding W3, and the capacitor C2 is charged with the current flowing through the diode D2; thus, power voltage VCC is generated. The power voltage VCC is necessary for the operation of the switch control circuit 10.

The detection voltage generator 20 generates an output detection voltage VS according to the auxiliary voltage VAUX. During OFF period of the power switch M, since the auxiliary voltage VAUX is a positive voltage proportional to the output voltage VO, the detection voltage generator 20 may generate the output detection voltage VS corresponding to the output voltage VO.

For example, the detection voltage generator 20 includes two resistors R2, R3 and a capacitor C1. The two resistors R2, R3 are connected in series between one end of the auxiliary winding W3 and the primary side ground. The capacitor C1 is connected between the node N1 which is connected to the two resistors R2, R3, and the primary side ground. The output detection voltage VS is generated at the node N1, at which time the capacitor C1 may filter the noise of the output detection voltage VS. However, embodiments are not limited to any specific example explained above. Accordingly, the capacitor C1 may be omitted.

The switch control circuit 10 may control the switching frequency according to the output detection voltage VS. The switch control circuit 10 includes a sample/holder 11, a linear controller 12, an oscillator 13, a PWM controller 14 and a gate driver 15.

The sample/holder 11 receives an input of the output detection voltage VS, samples the output detection voltage VS at each switching cycle, and holds the sampled voltage. For example, the sample/holder 11 may be configured to detect information on the output voltage VO, by sampling the output detection voltage VS at a certain time point during OFF period of the power switch M.

During OFF period of the power switch M, the auxiliary voltage VAUX is maintained constant until varied by resonance. To be specific, the auxiliary voltage VAUX is maintained constant as a positive voltage (n23*VO) proportional to the output voltage VO, before being varied by resonance from a time point that there is no more discharge current ID flowing. In one embodiment, the sample/holder 11 may sample the output detection voltage VS at a certain time point during a period the auxiliary voltage VAUX is maintained constant. The voltage (hereinafter, "sample voltage EAV") sampled by the sample/holder 11 is delivered to the linear controller 12.

The linear controller 12 generates reference current Iref which varies linearly according to the sample voltage EAV.

The oscillator 13 generates a clock signal CLK and a sawtooth wave SAW with linearly varying frequency according to the reference current Iref. The clock signal CLK and the sawtooth wave SAW may be used for controlling the switching frequency of the power switch M.

The oscillator 13 controls a source current ISO and a sink current ISI according to the reference current Iref, to generate a source current ISO and a sink current ISI varying linearly according to the reference current Iref.

For example, the linear controller 12 generates the reference current Iref which is linearly decreased in accordance with increasing sample voltage EAV, and the oscillator 13 may linearly increase the source current ISO and the sink current ISI in accordance with decreasing reference current Iref. As a result, the frequency of the clock signal CLK and the sawtooth wave SAW may increase linearly, resulting in the increased switching frequency.

On the contrary, the linear controller 12 may generate a reference current Iref which linearly increases in accordance with decreasing sample voltage EAV, and the oscillator 13 may linearly decrease the source current ISO and the sink current ISI in accordance with increasing reference current Iref. As a result, the frequency of the clock signal CLK and the sawtooth wave SAW may decrease linearly, resulting in the decreased switching frequency.

The PWM controller 14 estimates output power, using the sample voltage EAV and the current detection voltage VCS, and controls the switching operation by using a result of comparing the estimated output current with the sawtooth wave SAW and the clock signal CLK. For example, the PWM controller 14 may turn off the power switch M at a time point the sawtooth wave SAW reaches the estimated output power, and turn on the power switch M on a rising edge of the clock signal CLK. To this end, the PWM controller 14 may generate a gate control signal VGC to control the operation of the gate driver 15. For example, the gate control signal VGC may drop at a time point the sawtooth wave SAW reaches the estimated output power, and the gate control signal VGC may rise on a rising edge of the clock signal CLK.

The gate driver 15 generates a gate voltage VG according to the gate control signal VGC. The gate driver 15 may stop the switching operation of the power switch M in response to a protective signal PS which is generated as a protection operation is activated.

The switch control circuit 10 may stop the switching operation, when the sample voltage EAV is equal to, or higher than a predetermined overvoltage threshold voltage, or is equal to, or lower than a predetermined short circuit threshold voltage. The switching frequency is always controlled linearly in accordance with the output voltage VO, before the protection operation as mentioned above is performed.

Figure 2:
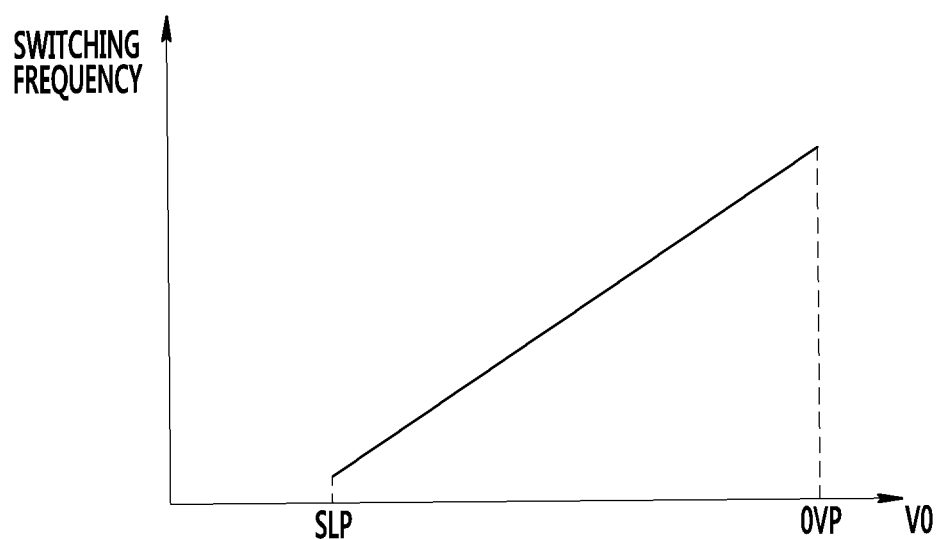
FIG. 2 illustrates relationship between switching frequency and an output voltage according to an embodiment.

FIG. 2 illustrates relationship between the switching frequency and the output voltage according to an embodiment.

Referring to FIG. 2, the output detection voltage VS or the sample voltage EAV may be used, instead of the output voltage VO.

As illustrated in FIG. 2, the switching frequency is linearly controlled according to the output voltage VO, when the output voltage VO is between the short circuit threshold voltage SLP and the overvoltage threshold voltage OVP. However, when the output voltage VO is lower than the short circuit threshold voltage SLP or when the output voltage VO exceeds the overvoltage threshold voltage OVP, the switching frequency may not be linearly controlled, but controlled differently. For example, when the output voltage VO is lower than the short circuit threshold voltage SLP due to a short circuit of a load, or when the output voltage VO exceeds the overvoltage threshold voltage OVP due to an open circuit of a load, the switching operation may be stopped by a protection operation.

After the protection operation is triggered, a switching operation may occur as a predetermined time by an auto restart. For example, a cycle skipping interval is passed after the protection operation is triggered, and a switching operation occurs. The output voltage VO is generated by the switching operation time, however, if the output voltage VO is lower than the short circuit threshold voltage SLP or exceeds the overvoltage threshold voltage OVP, the protection operation is retriggered and the switching operation is stopped. Again, after a cycle skipping interval is passed, a switching operation occurs, and these operation may be repeated.

A cycle skipping interval may occur based on a state of a load. For example, a cycle skipping interval occurs according to a burst mode when the load is a light load or there is no load.

A switching frequency may be maintained in constant on the condition that the output voltage VO is maintained in constant.

The switching frequency according to the embodiments is always controlled to increase or decrease linearly when cycle skipping due to extra conditions does not occur or the switching frequency is not maintained in constant.

Hereinafter, with reference to FIG. 3, the linear controller according to an embodiment will be explained.

Figure 3:
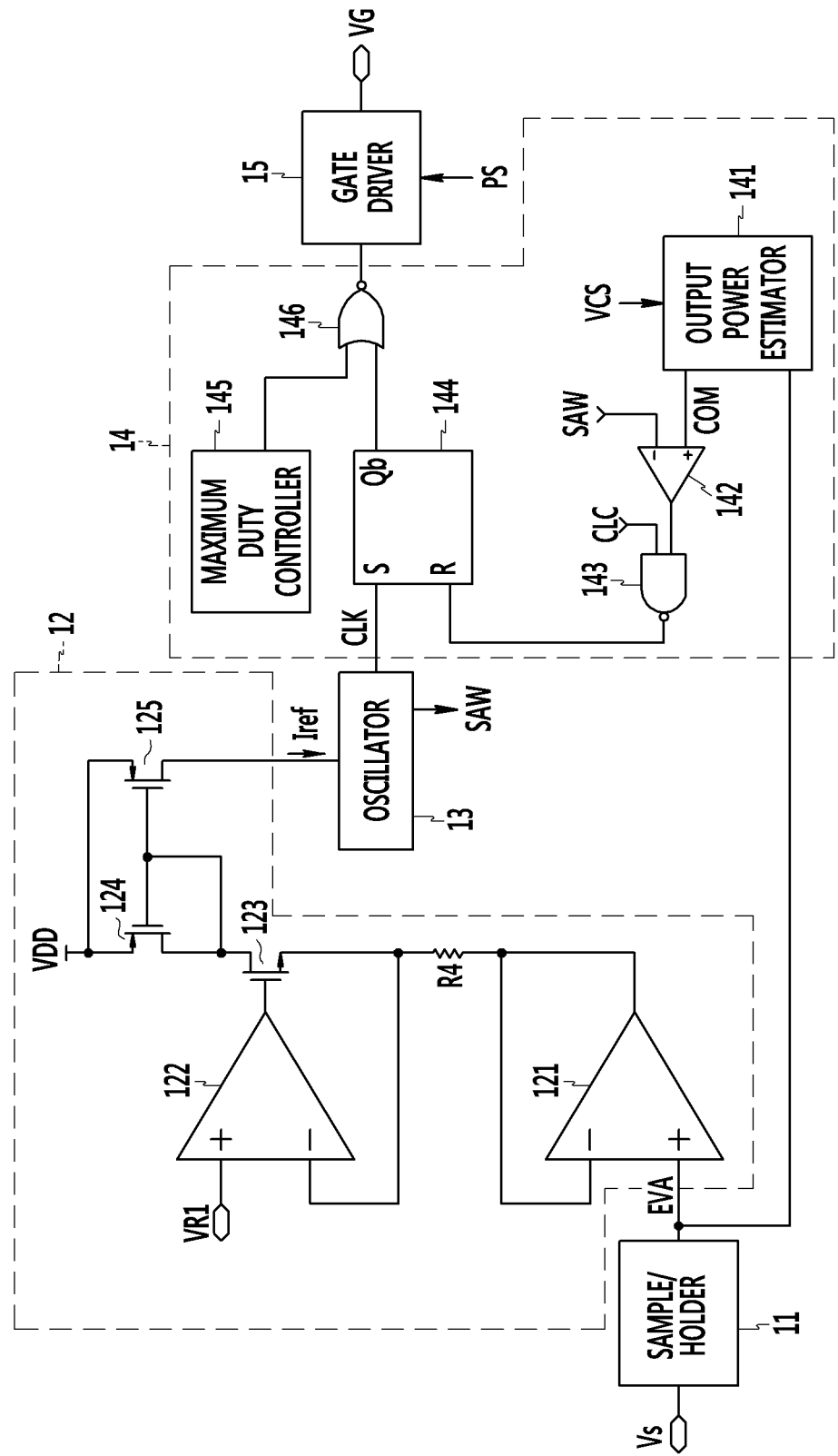
FIG. 3 illustrates a linear controller according to an embodiment.

FIG. 3 illustrates a linear controller according to an embodiment.

The linear controller 12 includes two error amplifiers 121, 122, two transistors 124, 125 forming a current mirror circuit, a transistor and a resistor R4.

The sample voltage EAV is inputted to a non-inversion terminal (+) of the error amplifier 121, while an inversion terminal (−) of the error amplifier 121 is connected to the output end. The error amplifier 121 receives an input of sample voltage EAV and operates as an outputting buffer. The output end of the error amplifier 121 is connected to one end of the resistor R4.

The reference voltage VR1 is inputted to the non-inversion terminal (+) of the error amplifier 122, while an inversion terminal (−) of the error amplifier 122 is connected to the other end of the resistor R4, and the output end of the error amplifier 122 is connected to the gate of the transistor 123.

The source of the transistor 123 is connected to the other end of the resistor R4, and the drain of the transistor 123 is connected to the drain and the gate of the transistor 124 which forms a current mirror circuit.

The gate and the drain of the transistor 124 are connected to each other, and the gate of the transistor 124 is connected to the gate of the transistor 125. The source of the transistor 124 and the source of the transistor 125 are connected to the voltage VDD. The two transistors 124, 125 form a current mirror circuit.

The error amplifier 122 and the transistor 123 operate to maintain the voltage at the other end of the resistor R4 at the reference voltage VR1. Accordingly, the current flowing the resistor R4 is obtained by dividing a difference between the reference voltage VR1 and the sample voltage EAV, by a resistance of the resistor R4, i.e., by (VR1−EAV)/R4.

The current flowing through the transistor 124 is copied at a predetermined ratio and flows the transistor 125. The current flowing through the transistor 125 is the reference current Iref. The reference current Iref is fed to the oscillator 13.

The oscillator 13 generates source current ISO and sink current ISI, using the reference current Iref. Hereinbelow, the configuration of the oscillator 13 will be explained with reference to FIG. 4.

Figure 4:
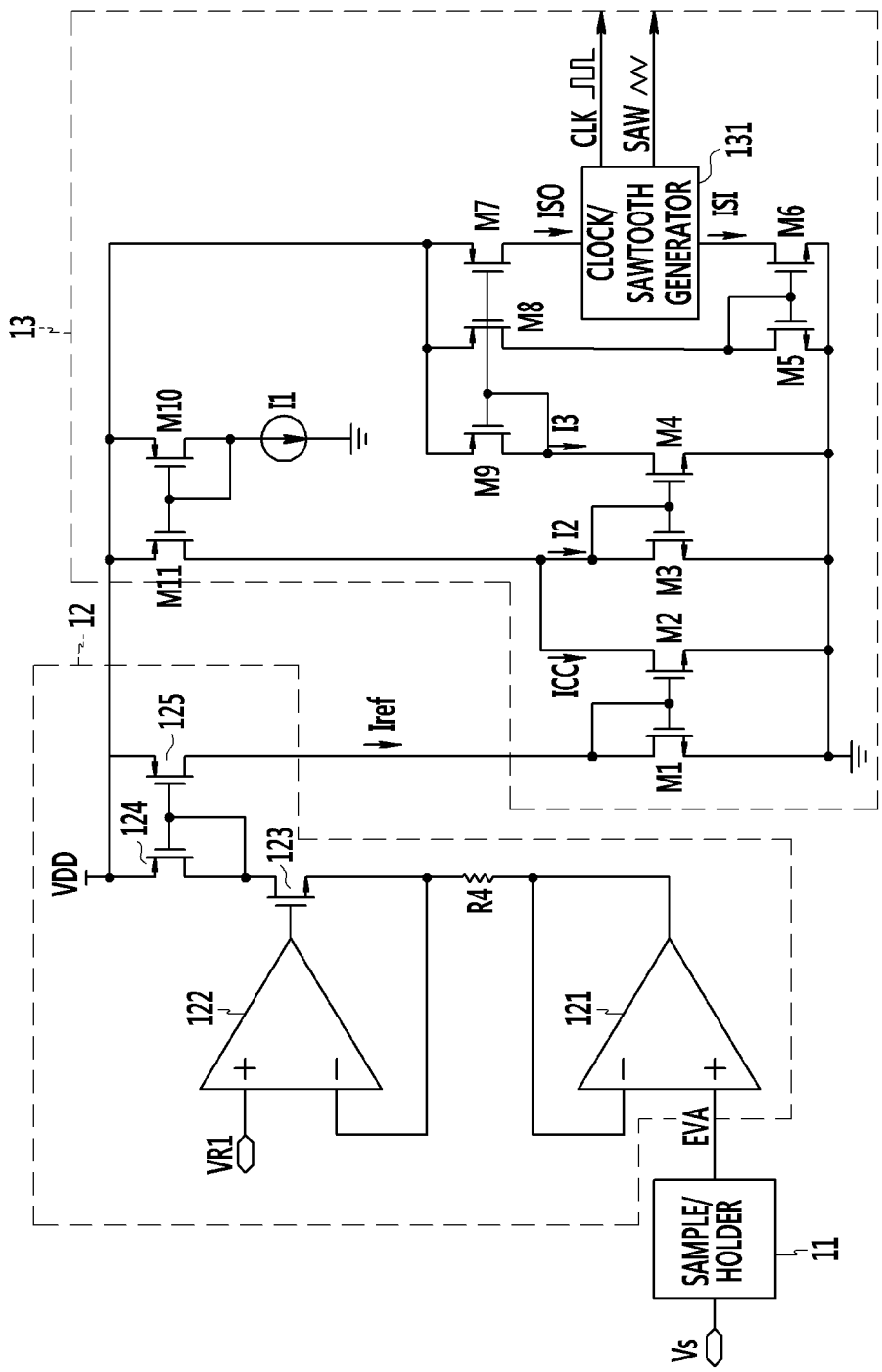
FIG. 4 illustrates a configuration of an oscillator according to an embodiment.

FIG. 4 illustrates a configuration of an oscillator according to an embodiment.

As illustrated in FIG. 4, the reference current Iref flows through the transistor M1. The gate and the drain of the transistor M1 are connected to each other, and the gate of the transistor M1 and the gate of the transistor M2 are connected to each other. Accordingly, the transistor M1 and the transistor M2 form a current mirror circuit. The current ICC, which is the reference current Iref copied at a predetermined ratio, flows through the transistor M2.

The gate and the drain of the transistor M11 are connected to each other, and the gate of the transistor M10 and the gate of the transistor M11 are connected to each other. Accordingly, the transistor M10 and the transistor M11 form a current mirror circuit. The sources of the transistors M10, M11 are connected to the voltage VDD. A sink current source I1 is connected to the drain of the transistor M10, and the current from the sink current source I1 is copied at a predetermined ratio and flows through the transistor M11.

The drain of the transistor M11 is connected to the drains of the transistors M3, M4. Accordingly, current I2, which is the current from subtracting the current ICC from the current flowing through the transistor M11, flows through the transistor M3.

The gate and the drain of the transistor M3 are connected to each other, and the gate of the transistor M3 is connected to the gate of the transistor M4. Accordingly, the transistors M3, M4 form a current mirror circuit. Current I3, which is the current I2 copied at a predetermined ratio, flows through the transistor M4.

The gate and the drain of the transistor M9 are connected to each other, and the gate of the transistor M8 and the gate of the transistor M7 are connected respectively to the gate of the transistor M9. Accordingly, the transistor M9 and the transistor M8, and the transistor M9 and the transistor M7 form current mirror circuits. The sources of the three transistors M7 to M9 are connected to the voltage VDD.

As the drain of the transistor M9 is connected to the drain of the transistor M4, the current I3 flows through the transistor M9. Current I4, which is the copied current I3 at a predetermined ratio, flows through the transistor M8, and source current ISO, which is the copied current I3 at a predetermined ratio, flows through the transistor M7.

The gate and the drain of the transistor M5 are connected to each other, and the gate of the transistor M5 and the gate of the transistor M6 are connected to each other. Accordingly, the transistors M5, M6 form a current mirror circuit. As the drain of the transistor M5 is connected to the drain of the transistor M8, the current I4 flows through the transistor M5. Sink current ISI, which is the copied current I4 at a predetermined ratio, flows through the transistor M6.

The source current ISO is fed to the clock/sawtooth wave generator 131, and the sink current ISI is sunk from the clock/sawtooth wave generator 131. The clock/sawtooth wave generator 131 generates sawtooth wave SAW which increases in accordance with the source current ISO and decreases in accordance with the sink current ISI. The clock/sawtooth wave generator 131 generates a clock signal CLK which rises or drops in accordance with a result of comparing the sawtooth wave SAW with a predetermined reference voltage.

Referring back to FIG. 3, the PWM controller 14 includes an output current calculator 141, a comparator 142, a NAND gate 143, an SR flip-flop 144, a maximum duty controller 145 and a NOR gate 146.

The output power estimator 141 may calculate an output power, using the sample voltage EAV and the current detection voltage VCS, and output a comparative signal COM representing the calculated output power. For example, the output power estimator 141 detects the output voltage VO based on the sample voltage EAV and estimates the output current IO based on the current detection voltage VCS. The output power estimator 141 may estimate the output power by using the detected output voltage VO and the estimated output current IO and generate a comparative signal COM indicative of an output power.

The comparator 142 outputs a result of comparing the sawtooth wave SAW and the comparative voltage COM. For example, the sawtooth wave SAW is inputted to the inversion terminal (−) and the comparative voltage COM is inputted to the non-inversion terminal (+). The comparator 142 outputs a high level when the input to the non-inversion terminal (+) is higher than the input to the inversion terminal (−), and outputs a low level when the input to the non-inversion terminal (+) is lower than the input to the inversion terminal (−).

The NAND gate 143 may perform a logic operation with a current limit signal CLC and output from the comparator 142, to output a signal to control a time point of turning off the power switch M. For example, using the current limit signal CLC, it may be enabled to low level when the primary side current IP exceeds a predetermined threshold. The current limit signal CLC is a signal that activates protection operation from overcurrent, and may be maintained at high level in normal operation.

When the current limit signal CLC is high level the output from the NAND gate 143 is determined in accordance with the output from the comparator 142. For example, when the sawtooth wave SAW is smaller than the comparative signal COM, the output from the comparator 142 is high level. Accordingly, the output from the NAND gate 143 is low level. When the sawtooth wave SAW is greater than the comparative signal COM, the output from the comparator 142 is low level. Accordingly, the output from the NAND gate 143 is high level.

The SR flip-flop determines an output in accordance with an input to a set S and an input to a reset R, inverse the determined output, and outputs the same to an inversion output end Qb. For example, when the input to the set S is high level, the SR flip-flop 144 inverses the high-level output to output a low-level output to the inversion output end Qb. When the input to the reset R is high level, the SR flip-flop 144 inverses the low-level output to output a high-level output to the inversion output end Qb.

The maximum duty controller 145 turns off the power switch M when the on-duty of the power switch M reaches a predetermined threshold. For example, it is possible to count the on-period of the power switch M and output a high-level output when the result reaches the threshold.

The NOR gate 146 performs a logic operation with an output from the SR flip-flop 144 and an output from the maximum duty controller 145 to thus generate a gate control signal VGC. For example, when an output from the SR flip-flop 144 is low level and an output from the maximum duty controller 145 is low level, the NOR gate 146 generates a high-level gate control signal VGC to turn on the power switch M, and when at least one of the output from the SR flip-flop 144 or the output from the maximum duty controller 145 is high level, the NOR gate 146 generates a low-level gate control signal VGC to turn off the power switch M.

The gate driver 15 generates a gate voltage VG in such a level to turn on the power switch M in accordance with a high-level gate control signal VGC, and generates a gate voltage VG in such a level to turn off the power switch M in accordance with a low-level gate control signal VGC. According to one embodiment, the power switch M is an n-channel type transistor, in which case a level to turn on may be high level, and a level to turn off may be a low level.

In a normal situation where no switching operation control is occurring by at least one of the maximum duty controller 145 or the current limit signal CLC, the power switch M may be turned on in synchronization with a rising edge of the clock signal CLK, or turned off in synchronization with the rising edge of the output from the NAND gate 143.

When the inversed output from the SR flip-flop 144 becomes low level in response to the rising edge of the clock signal CLK (during which the output from the maximum duty controller is low level), the output from the NOR gate 146 becomes high level. As a result, the power switch M is turned on.

After turn-on, the output from the comparator 142 becomes low level in synchronization with a time point that the increasing sawtooth wave SAW reaches the comparative signal COM (during which the current limit signal is high level), and the output from the NAND gate 143 becomes high level. When the inversed output from the SR flip-flop 144 becomes high level in response to the rising edge of the output from the NAND gate 143, the output from the NOR gate 146 becomes low level. As a result, the power switch M is turned off.

As explained above, according to embodiments of the present disclosure, efficiency of supplying power according to loads can be improved, by controlling switching frequency of the power switch M in a linear manner in accordance with a result of sampling an auxiliary voltage corresponding to an output voltage.

Although the exemplary embodiments of the present invention are described above in detail, the spirit or scope of the invention is not limited thereto. All various modifications by those of ordinary skill in the art using the spirit or scope of the invention of the appended claims and equivalents may belong to the scope of the right of the present invention.

DESCRIPTION OF SYMBOLS

1: Power Supply Device
10: Switch Control Circuit
11: Sample/Holder
12: Linear Controller
13: Oscillator
14: PWM Controller
15: Gate Driver

What is claimed is:

1. A power supply device, comprising:
a power switch;
a power delivering circuit configured to convert an input in accordance with switching operation of the power switch to an output; and
a switch control circuit configured to linearly control switching frequency of the power switch to be proportional to a detection signal corresponding to the output while a level of the output is between a first protection level and a second protection level.

2. A power supply device, comprising:
a power switch;
a power delivering circuit configured to convert an input in accordance with switching operation of the power switch to an output; and
a switch control circuit configured to linearly control switching frequency of the power switch in accordance with a detection signal corresponding to the output,
wherein the switch control circuit is configured to linearly control the switching frequency of the power switch in accordance with a sample voltage obtained by sampling the detection signal at a predetermined time point during a turn-off period of the power switch.

3. The power supply device of claim 2, wherein the switch control circuit is configured to generate a reference current that linearly varies in accordance with the sample voltage, and controls the switching frequency of the power switch in accordance with the reference current.

4. The power supply device of claim 3, wherein the switch control circuit is configured to generate a source current and a sink current based on the reference current, generate a clock signal and a sawtooth wave signal using the source current and the sink current, and control the switching operation of the power switch using the clock signal and the sawtooth wave signal.

5. The power supply device of claim 4, wherein the switch control circuit is configured to control turn-on of the power switch based on the clock signal, and control turn-off of the power switch based on the sawtooth wave.

6. A power supply device, comprising:
   a power switch;
   a power delivering circuit configured to convert an input in accordance with switching operation of the power switch to an output; and
   a switch control circuit configured to linearly control switching frequency of the power switch in accordance with a detection signal corresponding to the output,
   wherein the switch control circuit comprises:
   a sample/holder configured to sample the detection signal at a predetermined time point during a turn-off period of the power switch and generate a sample voltage by holding the sampled voltage;
   a linear controller configured to generate a reference current which varies linearly according to the sample voltage;
   an oscillator configured to generate a clock signal and a sawtooth wave signal, which linearly vary frequency according to the reference current; and
   a PWM controller configured to control the switching operation of the power switch, using the clock signal and the sawtooth wave signal.

7. The power supply device of claim 6, wherein the linear controller comprises:
   a buffer configured to receive an input of the sample voltage and output a result;
   a resistor with one end connected to an output end of the buffer;
   a transistor with one electrode connected to the other end of the resistor;
   an error amplifier comprising an output end connected to a gate of the transistor, a first input end to which a predetermined reference voltage is inputted, and a second input end connected to the other end of the resistor; and
   a current mirror circuit connected to the other electrode of the transistor.

8. The power supply device of claim 6, wherein the oscillator is configured to generate a source current and a sink current in accordance with the reference current, and generate the clock signal and the sawtooth wave signal using the source current and the sink current.

9. The power supply device of claim 8, wherein the oscillator comprises:
   a first current mirror circuit configured to generate a first current by copying the reference current at a predetermined ratio;
   a second current mirror circuit configured to generate a second current by copying a current generated by subtracting the first current from a predetermined current provided by a predetermined current source, at a predetermined ratio;
   a third current mirror circuit configured to generate the source current by copying the second current at a predetermined ratio;
   a fourth current mirror circuit configured to generate the sink current by copying the third current corresponding to the second current at a predetermined ratio; and
   a clock/sawtooth wave generator configured to generate the sawtooth wave which increases in accordance with the source current and decreases in accordance with the sink current, and generate the clock signal based on a result of comparing the sawtooth wave with a predetermined reference voltage.

10. The power supply device of claim 1, further comprising an auxiliary winding insulatively coupled, at a predetermined turns ratio, with a winding connected to the output voltage, wherein
   the detection signal is based on voltages at both ends of the auxiliary winding.

11. The power supply device of claim 1, wherein the switch control circuit is configured to linearly control switching frequency of the power switch in accordance with the detection signal when a cycle skipping does not occur or the switching frequency is not maintained in constant.

* * * * *